United States Patent [19]
Lotz et al.

[11] Patent Number: 5,765,271
[45] Date of Patent: *Jun. 16, 1998

[54] APPARATUS FOR DEBURRING SLABS

[75] Inventors: Horst K. Lotz; Mattias Lotz, both of Hofheim-Wallau, Germany

[73] Assignee: GeGa Corporation, Pittsburgh, Pa.

[*] Notice: The term of this patent shall not extend beyond the expiration date of Pat. No. 5,597,030.

[21] Appl. No.: 790,359

[22] Filed: Jan. 28, 1997

Related U.S. Application Data

[62] Division of Ser. No. 403,370, Mar. 15, 1995, Pat. No. 5,597,030.

[30] Foreign Application Priority Data

Mar. 16, 1994 [EP] European Pat. Off. .............. 94104071

[51] Int. Cl.[6] .................................................. B23P 23/04
[52] U.S. Cl. ................................... 29/33 A; 409/300
[58] Field of Search .......................... 29/33 A, 81.17, 29/81.11, 81.1; 409/301, 303, 300, 297, 298; 225/47, 103, 104

[56] References Cited

U.S. PATENT DOCUMENTS

| | | |
|---|---|---|
| 3,377,896 | 4/1968 | de Corta ............................ 83/3 |
| 3,515,029 | 6/1970 | Gambini ........................... 90/11 |
| 4,357,817 | 11/1982 | Linsinger ......................... 72/71 |
| 4,672,726 | 6/1987 | Delbecq .......................... 29/33 A |
| 4,704,241 | 11/1987 | Boggs ............................ 29/81.1 |
| 5,179,772 | 1/1993 | Wojciechowski ................. 29/33 A X |

FOREIGN PATENT DOCUMENTS

| | | | |
|---|---|---|---|
| 3210951 | 9/1991 | Japan ......................... 164/460 |
| 1389946 | 12/1985 | U.S.S.R. ...................... 409/297 |

Primary Examiner—William R. Briggs
Attorney, Agent, or Firm—Alan G. Towner; Eckert Seamans Cherin & Mellott, LLC

[57] ABSTRACT

Apparatus for removing burrs from flame cut steel slabs having a rotating shaft and burr knocking members loosely mounted on the shaft for impact removal of the burrs.

7 Claims, 11 Drawing Sheets

APPARATUS FOR DEBURRING SLABS

This is a division of application Ser. No. 08/403,370 filed Mar. 15, 1995, U.S. Pat. No. 5,597,030.

FIELD OF THE INVENTION

When cutting with oxygen, especially in continuous steel casting plants, on both lower cutting edges—i.e., at the front and the end of each cut-off work place—bigger or smaller burrs consisting of a mix of brittle iron oxide and steel will form by the downward flow of hot slag. A portion of these burrs will hang down from the edges like icicles. Another portion will form relatively flat rolls on the work piece lower surface close to the edges. Another portion will be in different sizes and combinations of the first two. Formation of the burrs will depend on the material compositions, material temperatures and the chemo-physical operation of the cutting tools. In any case the presence of such burrs mars the finish and interferes with transport of cut lengths through the mill.

The avoidance of such cutting burrs would be desirable, but this is not realistic. A substantial reduction is possible depending on circumstances, but the size of the burrs cannot be maintained within acceptable limits without additional cleaning.

DESCRIPTION OF PRIOR ART

Various methods and procedures have been used to eliminate the burrs promptly after cutting the work piece, for instance:

by melting away, flame cutting off or flame scarfing off with a hand-held oxygen torch by melting away, flame cutting off or flame scarfing off with an oxygen torch machine knocking off or chiseling off by hand knocking off, pushing off, shearing off with machines which are equipped with hammer-type, chisel-type or shear blade-type tools While flame deburring methods show advantages in deburring speed, they have substantial disadvantages arising from fume production, slag splashing, slag disposal, water requirement and danger of fire and explosion. Accordingly, there is a desire to use mechanical deburring equipment. In reaching a decision to use such equipment, it is necessary to consider mechanical equipment required, energy needs, time loss in using the equipment, and the disposal of the burr material removed. A part of the time loss lies in the proper adjustment of the relationship between the burr and deburrer before the operation and by the fact that the burr can only be deburred from the work piece surface towards the edge. Time is also required for a slowly advancing and stepwise repeating of the operation. This is necessary with either concave or convex formed lower surfaces, i.e., with continuous cast slabs to eliminate the burr fully, not merely in the middle with a convex section or at the outer edges with a concave section. Also, there may be inclined positions or distortions of the work piece resulting from internal and external cooling conditions of the strand.

The most simple mechanical deburrer known, consists of a rocking shear (EPA 8730150.1.0) swivelling around an axle and pressing a shearing edge against the lower slab surface when the burr is approaching. This rocking one blade design and rotation will adjust to any height differences by an upward lifting movement. The apparatus is not well suited, however, to deburr crowned shaped deformations of the lower surface. With such equipment, a good deburring result is limited to geometrically plane lower surfaces.

More expensive is a machine (patent applied for by a company named BWG) with an upward pressed arm moving forward and backward with a shear disc at the upper end of the arm. This stepwise knocks off pieces of burr depending on the shear disc sizes. The cantilevering arm of considerable length, the number and type of motions result in a slow, but successfully deburrer. The machine involves, however, high maintenance requirements and substantial space requirements on one side of the work piece.

A third successful deburring method is presented by a roller shaped deburrer (patent applied for by a company named Plakoma) with welded-on shear rings. Under a run-in slab, the roller is pressed up, and the adjacent shear rings lift the slab and shear off the burr piece by piece. One shear ring on the roller works at a time, until after lowering the slab onto the roller, a new lifting and shearing-off of a piece of burr is performed by the next shear ring. This process is very noisy and requires a very accurate positioning of the work piece for deburring in order to achieve good results. In addition, the process is time consuming.

An extremely fast but also very noisy deburring process is carried out with a rapidly rotating roller having little hammers, which knock off little pieces of the burr by striking it repeatedly at the lower edge of a work piece travelling over the roller. Disadvantages are high wear and necessary protection against flying pieces of the burr and hammers as well as against noise and high installation costs.

Another drawback of the equipment described above is that it is limited to simple sections, i.e., essentially to straight burr lines.

BRIEF DESCRIPTION OF THE DRAWINGS

The invention is illustrated in the accompanying drawings in which.

The methods and machines mentioned above are made obsolete by mechanical deburring devices for removing oxy-cutting burrs (EPA 90112027.9), which deburrs more reliably and completely, needs less space, makes little noise and works relatively fast. Such a deburring machine is shown in FIG. 1 and is indicated generally at (10).

Figure 1:
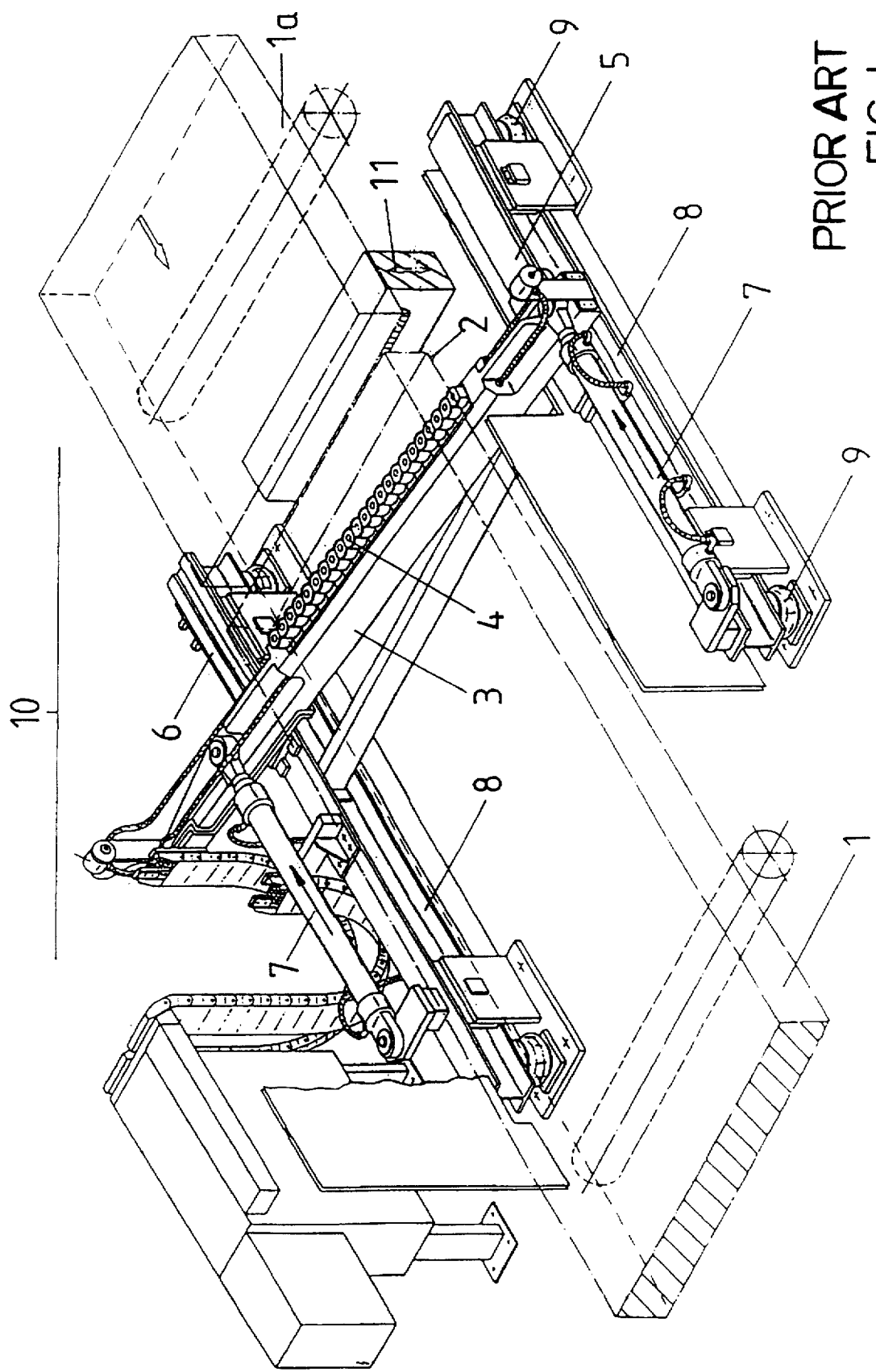
FIG. 1 is a perspective view of a known type of mechanical deburring apparatus.

FIG. 1 shows a work piece (1) (for instance a slab) with an oxygen cut burr (2) and an inclined shear beam (3) with a number of individually operated shear pistons (4) mounted on beam (3). The shear beam (3) is positioned below the work piece and rests on each end on shear slides (5), which can be moved forward and backward on slide guides (6) by hydraulic shear cylinders (7) for deburring. All above elements sit on a main frame (8) on each side of the work piece (1), and which themselves can be lifted by two lifting cylinders (9).

For deburring by work piece motion, the movement of shear beam (6) and drive parts comprising deburring slides (5), slide guides (6) and deburring cylinders (7) can be eliminated.

A normal operation cycle with deburring machine (10) works out as follows: The work pieces (1 and 1a) travel forward and then backward to face the deburring beam (3) in the working area of the deburring machine (10). A lifting and lowering stop (11) is provided to assist in handling the work pieces. The lifting cylinders (9) lift main frame (8), deburring slide (5) and slide guides (6) and deburring beam (3) into a working position beneath the work piece (1). Thereafter the deburring pistons (4) are individually pressed up by their pushing cylinders (12) (FIG. 2) against the more or less plane lower surface of the work piece (1) near the cutting burr (2). Deburring beam (3) is slightly inclined to the line of the burrs on the work pieces. Deburring cylinders (7) push the deburring beam (3) with its shearing pistons (4) one after the other against the cutting beard (2) and shears it off. The deburring pistons (4), which rise to full height behind the work piece (1) after this action will then be retracted again by the double acting pushing cylinders (12). The deburring beam (3) is now shifted under the end of a second work piece (1a), the deburring pistons (4) are pressed up again individually and a shearing procedure in opposite direction is performed. Afterwards the deburring pistons (4) and the deburring beam (3) are lowered and the work pieces (1 and 1a) travel off respectively into a new operation position.

While this deburring machine (10) operates reliably and successfully, it is not only heavy and costly but also is difficult to maintain; the exchange of the deburring pistons (4) is difficult and time wasting. Moreover, the burrs on longitudinal cuts or on complex cuts are not removed or are removed only with difficulty.

Figure 2:
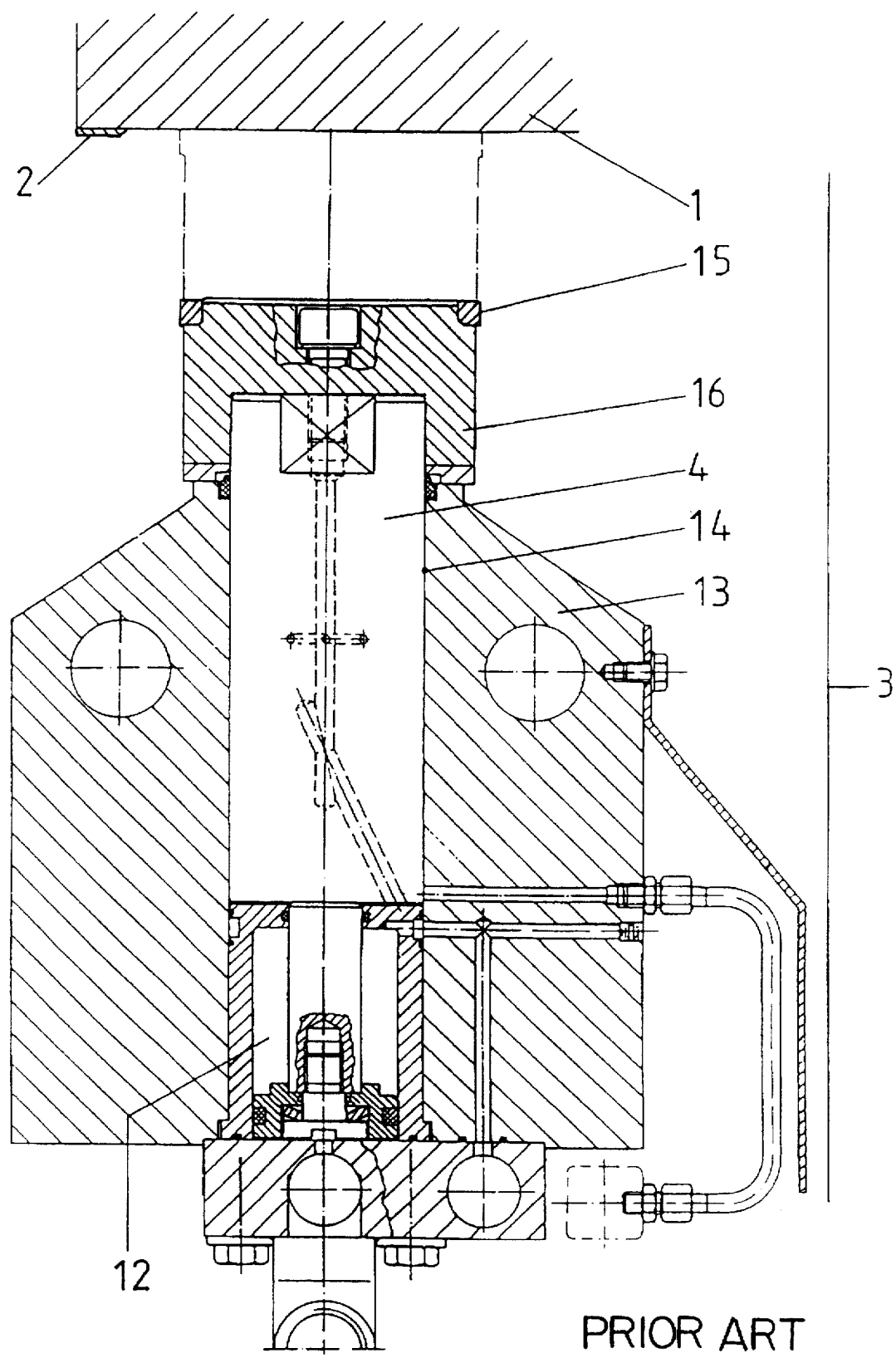
FIG. 2 is a sectional view of one of the deburring pistons of the apparatus shown in FIG. 1.

In FIG. 2 the cross-section of the deburring beam (3) of above described deburring machine (10) is shown, and it is described for better understanding of the invention described hereinafter. The deburring beam body (13) is machined fully out of a bigger raw material piece has a guiding bore (14) for each pushing cylinder (12), in which a deburring piston (4) with an individual shear cap (16) moves up and down. In operation, the pressure of the compressed air in the pushing cylinders (12) must be high to ensure that the toughened cutting edge (15) of each shear cap (16) having approximately 20 cm$^2$ surface, is pressed against the lower surface of the work piece (1) with enough force that it will not slip over a flat, hard cutting burr (2) during deburring.

By above-mentioned high pressure during deburring a friction force between the surface of the cutting edge (15) and the lower surface of the work piece (1) opposite to the deburring movement is formed. The friction force adds to the originally necessary shearing force and increases the pressure between deburring piston (4) and the guiding bore (14) with the obviously bad lever relations and deforms and strongly wears the guiding bore (14). To overcome those problems, the length of the deburring piston (4) is increased and made exchangeable, and high tensile strength guiding sleeves (not shown) are provided.

This situation will be even more critical, if the cutting edge (15) travels up on the flat oxygen cut beard (2), and this with a very disadvantageous small angle transforms the shearing force into a great vertical force, counteracting the pushing up force. Against this the pushing up force must be high to allow safe deburring with a worn cutting edge (15). This again increases the shearing force and the pressures at the deburring pistons (4). The danger of the cutting edge (15) travelling up the cutting burr (2) exists especially when a face of the cutting edge (15) meets the projecting or receding cutting burr (2) on the work piece (1), presses up on it and can then slip in the gaps left in between parts of the burr.

While the exact positioning of the work piece (1) for deburring with this deburring machine (10) in view of travel of the deburring surfaces, lighter work pieces (1) must be held down during deburring. The great upward forces required for deburring are very disadvantageous because of wear and because they interfere with fast deburring. It is desirable to improve the operational reliability with the many individually supplied and controlled pushing cylinders (12) and to simplify maintenance by easy exchange of the deburring pistons (4) from one side of beam (3) and to better use the total circumference of the cutting edge (15) of the deburring pistons (4). The deburring machine (10) therefore is to be developed further with regard to application possibilities, expenditure for the deburring machine (10) itself and for the auxiliary equipment, improved maintenance and simplified operation.

Figure 3:
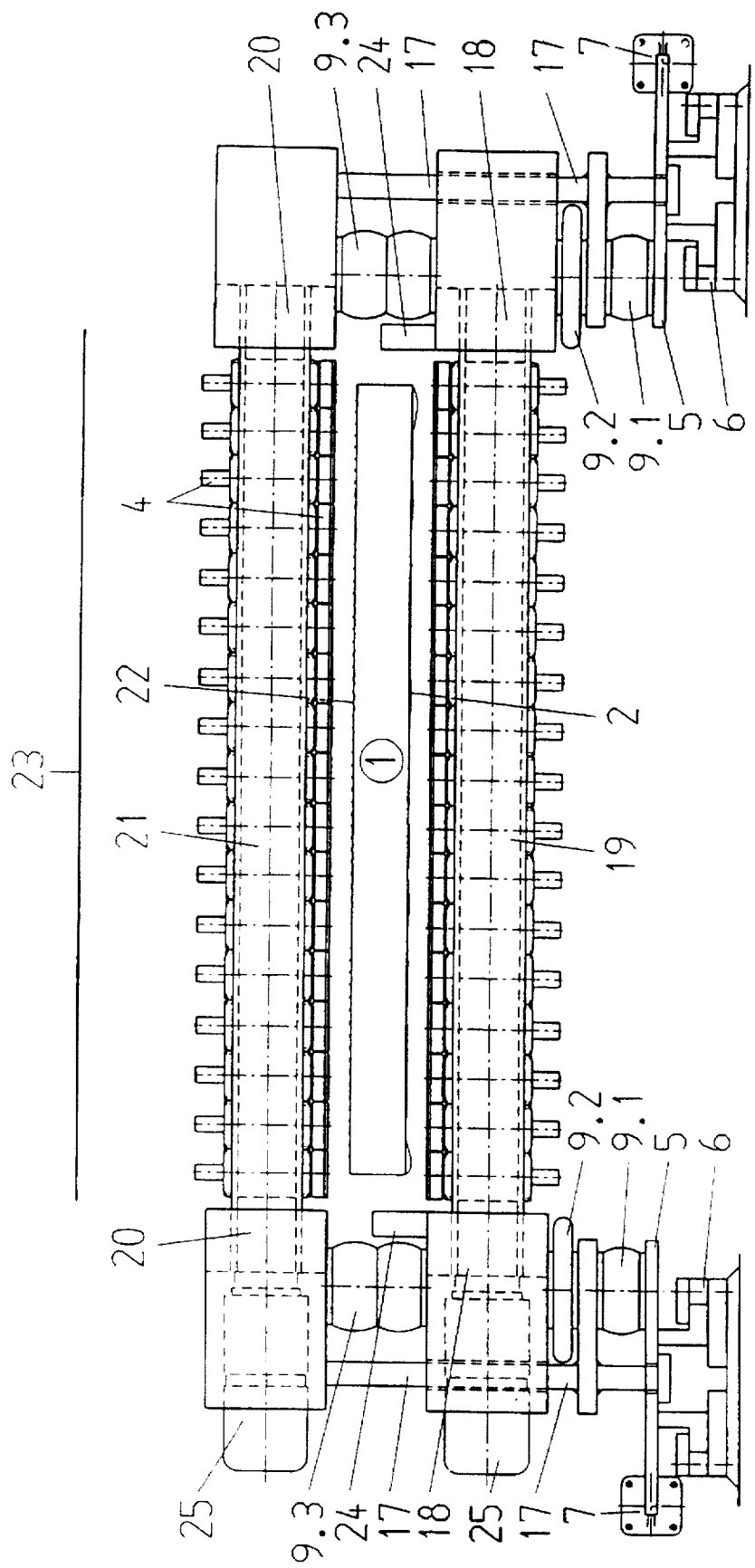
FIG. 3 is a side elevational view of apparatus similar to that of FIG. 1 showing shear beams and associated deburring pistons above and below the work piece.

Our invention applied for and described on 10Mar. 1994, consists in accordance with the claims and the FIG. 3 of a one-sided or a two-sided slide guide (6) on which deburring slides (5) are movable by deburring cylinders (7) in the axis of the work piece (1). These support a limited height adjustment lifting frame (17) via air operated lifting cylinders (9.1). In these, the swivel bearings (18) for the lower piston bodies (19) are arranged on further lifting cylinders (9.2), whereas the upper swivel bearings (20) for the upper piston body (21) are fixed on the upper portion of the lifting frame (17). Between the shiftable swivel bearings (18) of the lower piston body (19) and the upper piston body (21) more lifting cylinders (9.3) are installed, which together with the lifting cylinders (9.1) between the deburring slide (5) and the lower lifting frame (17), the piston bodies (19) and (21) travel from each other and the lifting frame (17) up into starting position. If a work piece (1) covered on its lower end with an oxygen cutting burr (2) and at the upper end with cutting beads (22), is moved into the deburrer (23), the lifting cylinders (9.2) in the lifting frame (17) below the swivel bearings (18) of the lower piston body (19) push the latter up against the lower surface of the work piece (1) for deburring. At the same time, the lifting frame (17) with the piston body (21) acts downward on the upper surface of the work piece (1) to deburr by movement of the deburring slides (5) driven by the hydraulic deburring cylinders (7). Should the work piece (1) be turned around in transport, i.e., arriving in the deburrer (23) with the cutting burr (2) on top and the cutting beads (22) on the bottom, deburring is possible. For heavy pieces, the down holder can be deleted with this deburrer (23). Should the pressure from below be greater than the weight of the slab, however, the second piston body (21) can be equipped with glide caps, glide shoes, rolls or itself can be designed to be a down holding roll (21). Such an arrangement will be advantageous for lighter work pieces (1).

Between the lower and the upper swivel bearings (19, 21) thickness blocks (24) are inserted to provide a minimum size window for the work piece (1) against the lifting cylinders (9), when blocks (24) are engaged, only the pressure in the piston bodies (19, 21) against the deburring pistons (4) is effective.

The swivel bearings (18, 20) carry a rotation drive (25) and a rotation stop to adjust and to limit an operation angle between deburring pistons (4) and work piece (1). The drive can as well serve to rotate the piston body into a repair or cleaning position.

Figure 4:
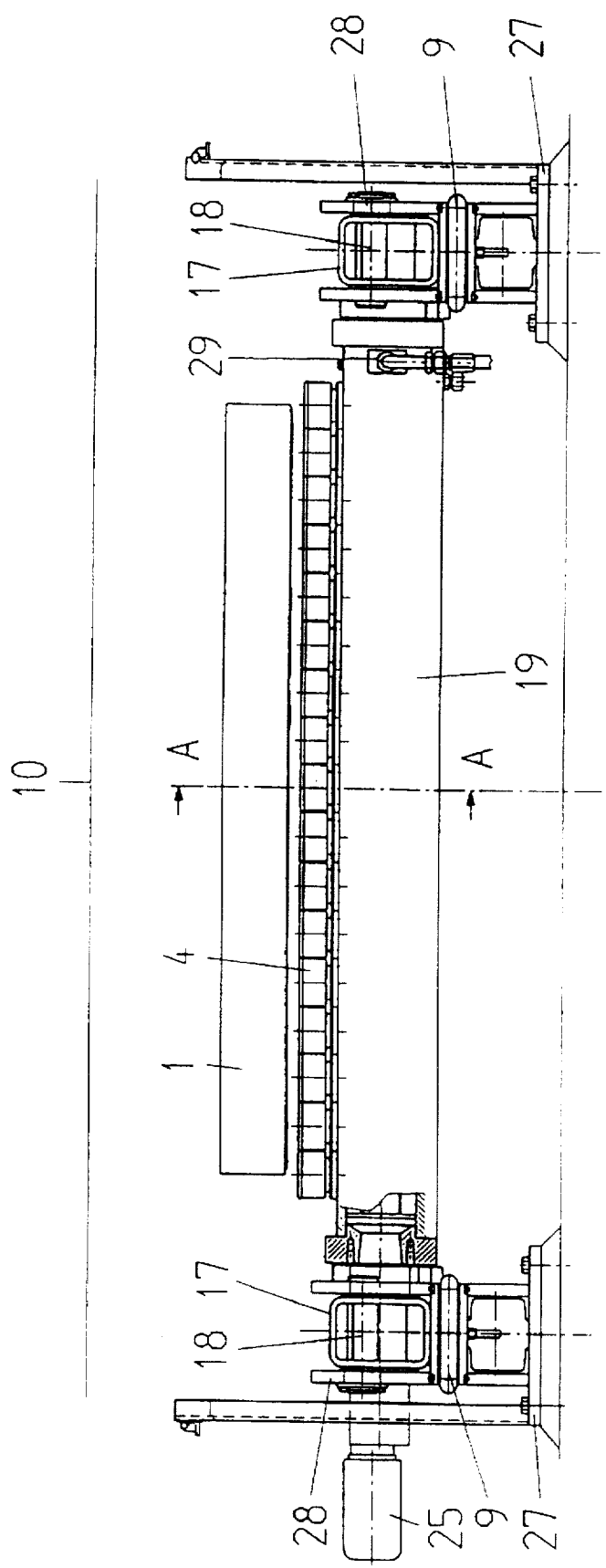
FIG. 4 is a side elevational view of apparatus FIG. 1 showing the shear beam and deburring pistons.

FIG. 4 shows a front elevation of a simplified deburrer (23), consisting of swivelling gearings (18) on both sides of the lifting frames (17) lift table on both sides by four lifting cylinders (9) from the base plate (27) with lifting guides (28) for the piston body (19). This deburrer (23) deburrs when stationary with deburring pistons (4) pushed up against the work piece (1) from below, when the work piece (1) is pulled over the piston body (19). By an air supply pipe (29) the whole piston body (19) is put under pressure and all deburring pistons (4) together are run out.

It is important that all deburring pistons (4) are or will be run out with a lower air pressure and touch the lower surface of the work piece following its form when lifting the piston body (19) by the lifting cylinders (9) just before each deburring process.

Figure 5:
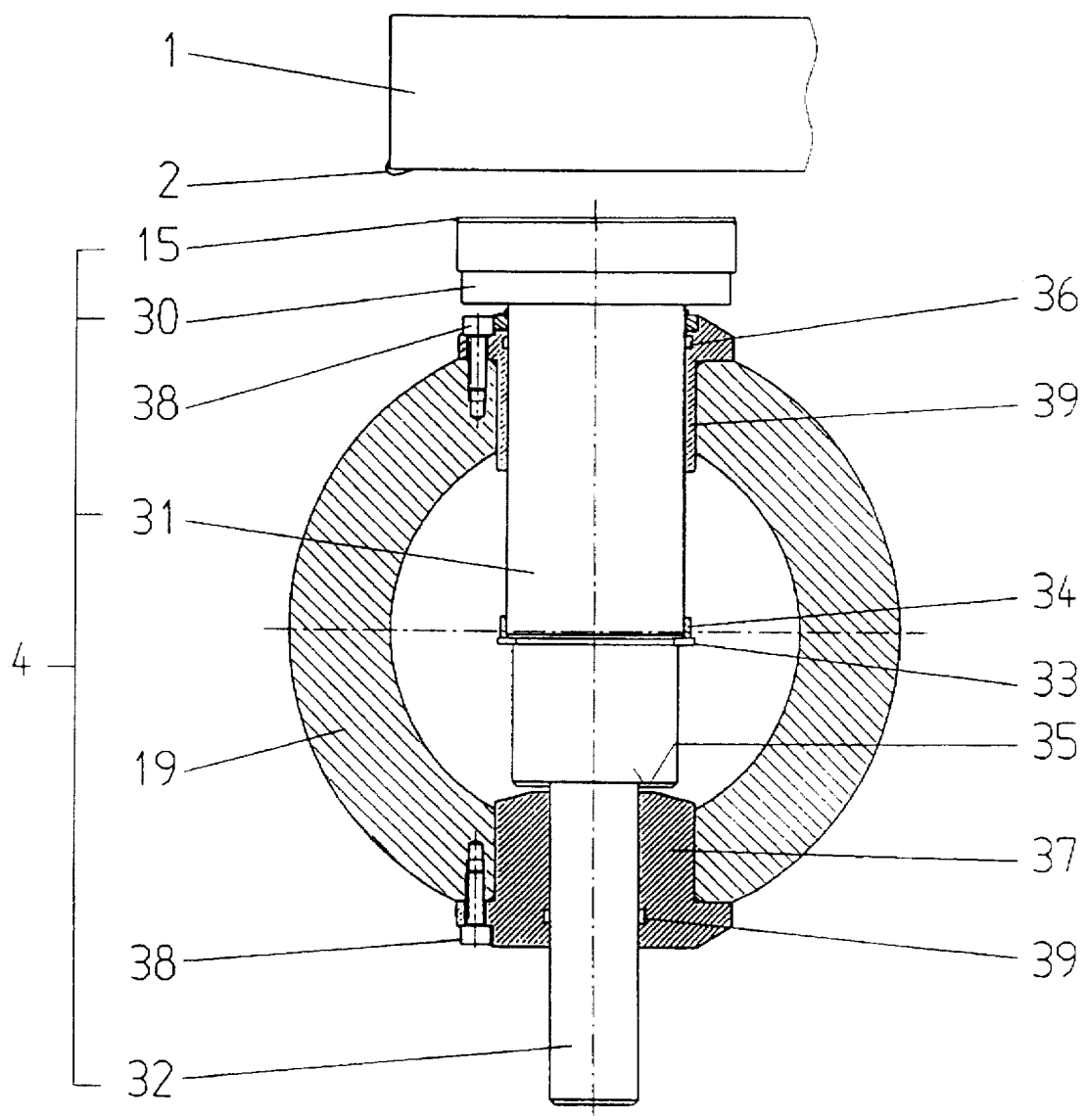
FIG. 5 is a sectional of one form of mounting the pistons shown in FIG. 4.

From FIG. 5 it can be seen that the piston body (19) corresponding to the former shear beam (3), is made basically from an unmachined, thick-walled pipe, which acts as an unmachined cylinder room for the double diameter deburring pistons (4). The deburring piston (4) is a single part incorporating shear head (30) with cutting edge (15), working piston (31) and piston shaft (32) and a spring ring (33) holding a buffer ring (34) made of elastic material against being pushed out. The difference of surface between working piston (31) and piston shaft (32) forms an effective pressure surface (35) to press the shear head (30) against the lower surface of the work piece (1). The deburring piston (4) is guided in the upper piston sleeve (36) and lower piston sleeve (37), which are held by hexagonal socket-head bolts (38) passing through like size bores of the piston body (19). Sealing rings (39) in the piston sleeves (36, 37) which could also be positioned in ring grooves of the working piston (31) or on the piston shaft (32), seal off the compressed air filled interior of the piston body (19) against pressure losses by the in and out moving working piston (31). The diameter of the various elements in the area of the working piston makes it possible for the deburring piston (4) to be fully pulled out of piston body (19) with the shear head (30) first for which only the upper piston sleeve (36) need be loosened and pulled out.

The deburrer described in our patent application of 10 Mar. 1994, with pneumatically or hydraulically pushed out deburring pistons (4) from a piston body (19) with a defined angle against the lower surface of the work piece (1) to be deburred, can be applied as seen from FIGS. 3, 4 and 5 for flat and round work pieces (1) and even for work pieces (1) with other cross sections. The quiet working procedure of the apparatus and its great diversity are unsurpassed so far.

DESCRIPTION OF PREFERRED EMBODIMENTS

When there is a lack of space and a requirement for fast production flow and high production efficiency, for example, longitudinally divided work pieces (1), the invention of a deburring machine described below and named "exburrer" for distinction will produce more noise and dust but is an economic solution for the deburring task for flat work pieces (1).

The principle of the exburrer is that discs are hurled around by a fast rotating shaft with a camshaft-type appearance with different axis portions and having relatively big interior bores.

Figure 6:
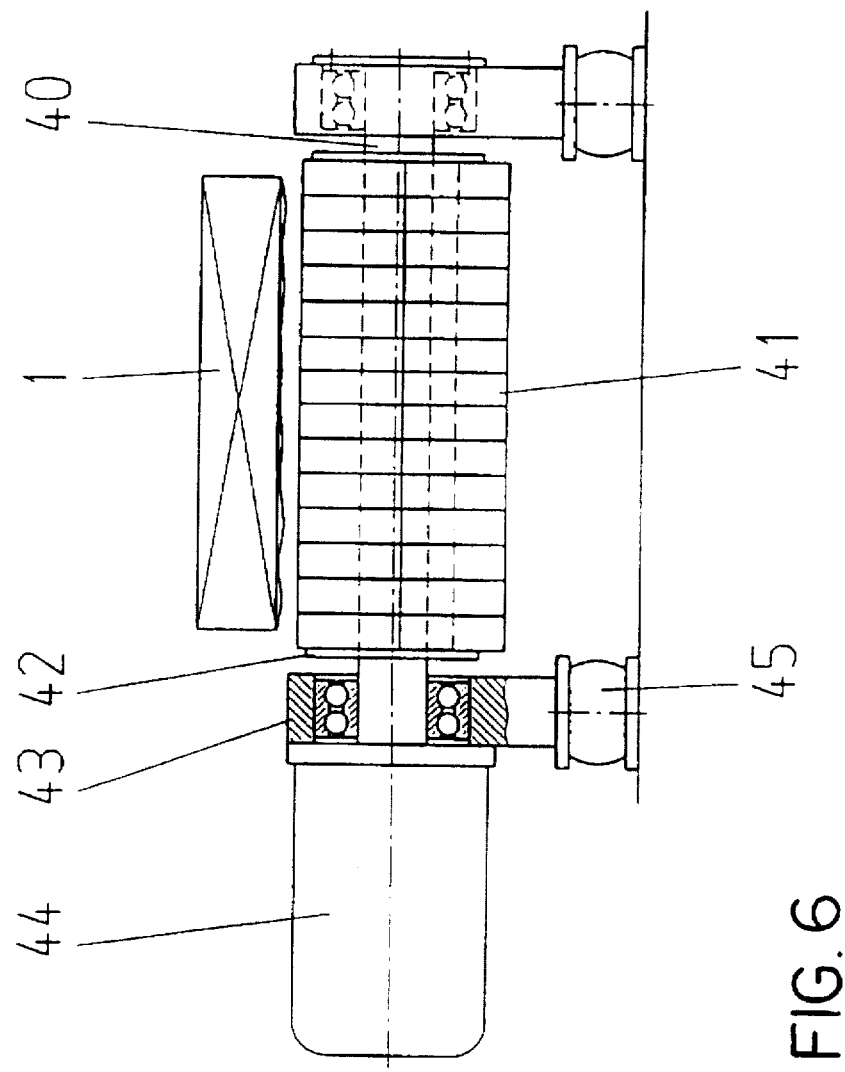
FIG. 6 is a side elevational view of a rotatable shaft and knocking rings embodying the invention of this application.
Figure 7:
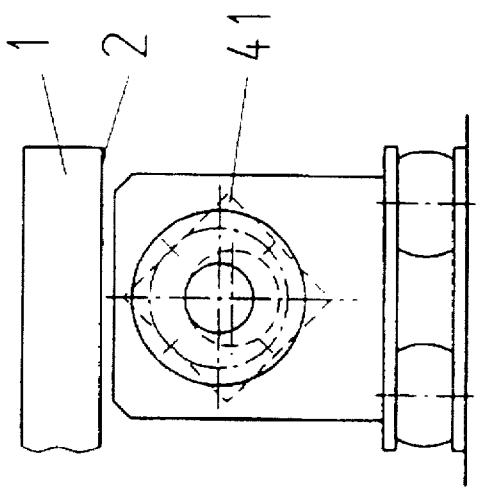
FIG. 7 is an end view of the apparatus shown in FIG. 6.

FIGS. 6 and 7 shows the invented lay-out of an exburrer. A knocking shaft (40) carried by side bearings (43) is arranged under the work piece (11). Knocking discs (41) with oversized interior bores are pushed onto shaft (40) between two end bushes (42). When shaft (40) is rotated rapidly by the drive (44), friction between the knocking shaft (40) and the knocking discs (41) causes the discs to be rotated. If the distance between the cutting burr (2) and the lower surface of the work piece (1) is smaller than the difference between the diameter of the knocking shaft (40) and the interior diameter of the knocking disc (41), then the knocking disc (41) must strike against the lower surface of the work piece (1), as shaft (40) is moved towards the cutting burr (2). With a high number of rotations many such strikes occur which reach the cutting burr (2) when shifting the work piece (1) and knock the burr off in more or less smaller pieces depending in size, firmness, composition and temperature. It appears to be important that the direction of rotation, i.e., the knocking direction, is always directed from under the lower surface of the work piece (1) against the cutting burr (2), no matter in which direction the work piece (1) or the exburrer (40–44) are moving.

Figure 8:
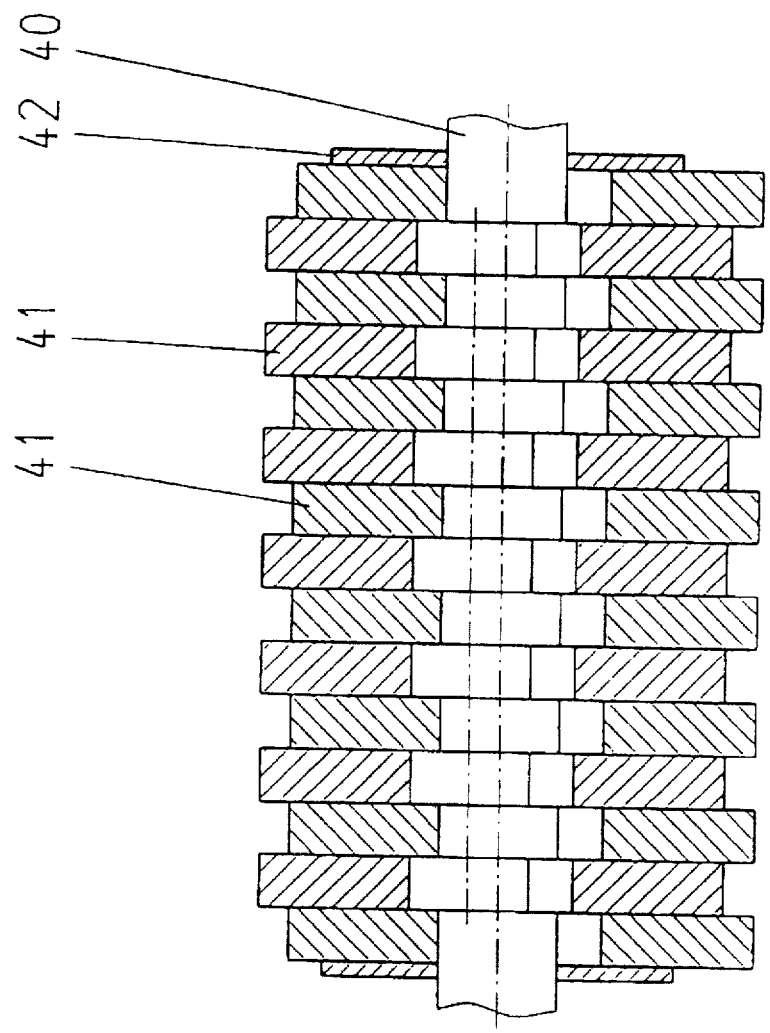
FIG. 8 is a partial side elevational view taken in section of a preferred form of the shaft and knocking rings shown in FIG. 6.
Figure 9:
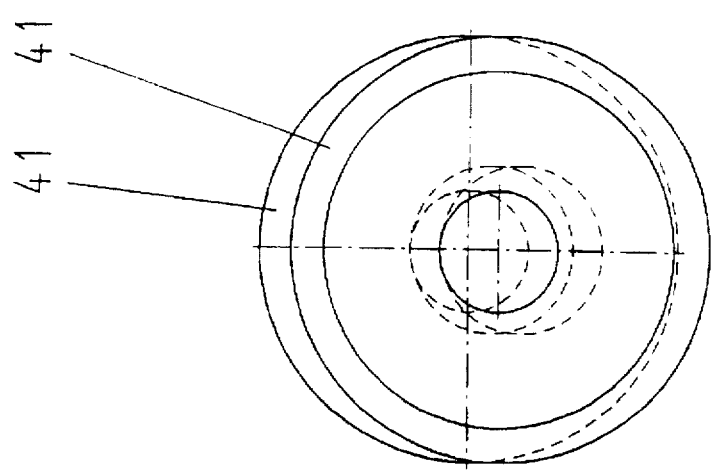
FIG. 9 is an end elevational view of the apparatus shown in FIG. 8.

To ensure a hurling effect, i.e., to become more independent from the friction between knocking shaft (40) and the knocking discs (41), the knocking shaft (40) is manufactured with eccentric steps as shown in FIGS. 8 and 9, so that shaft (40) whirls around the knocking discs (41) like a camshaft or a crankshaft.

To lower the complete exburrer (40–44) outside the deburring operation for safety reasons, and to dampen unwanted forces, it is positioned on pneumatic lifting elements (45).

Figure 10:
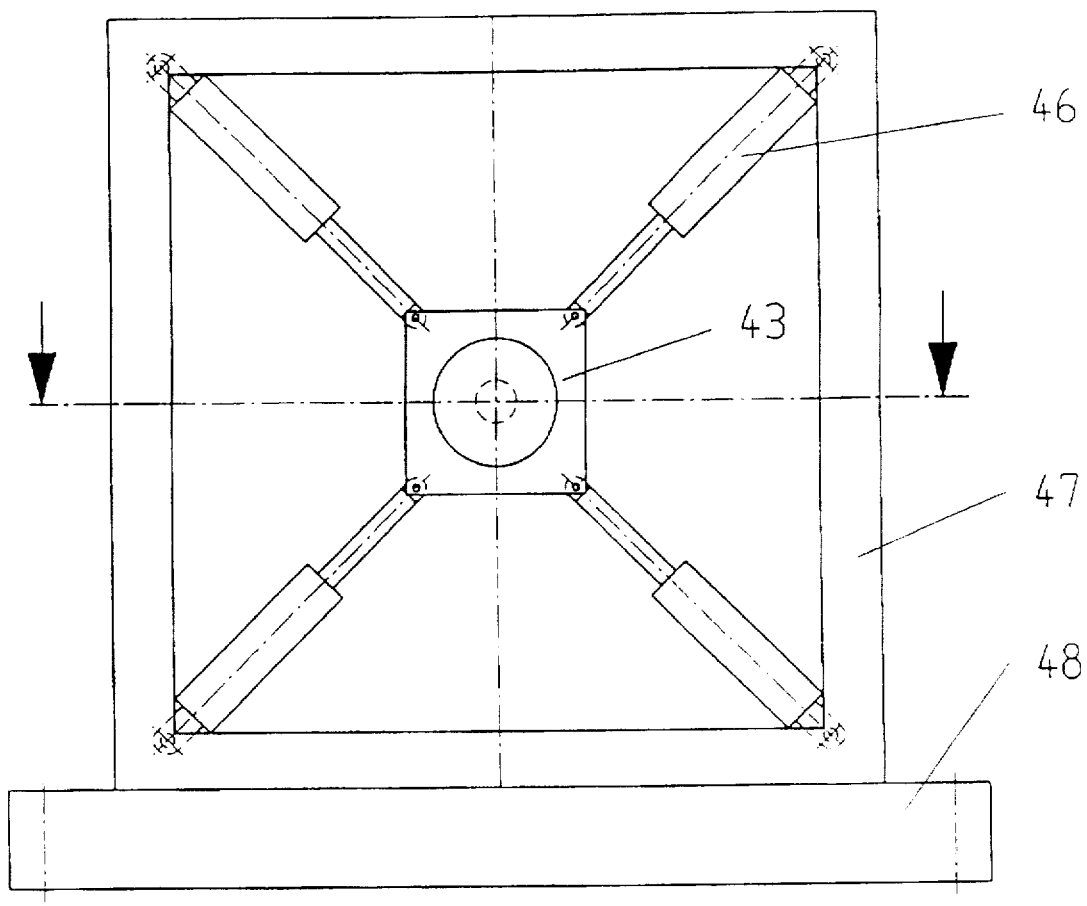
FIG. 10 is an end elevational view of shock absorber mounts for the rotatable shaft of FIG. 6.
Figure 11:
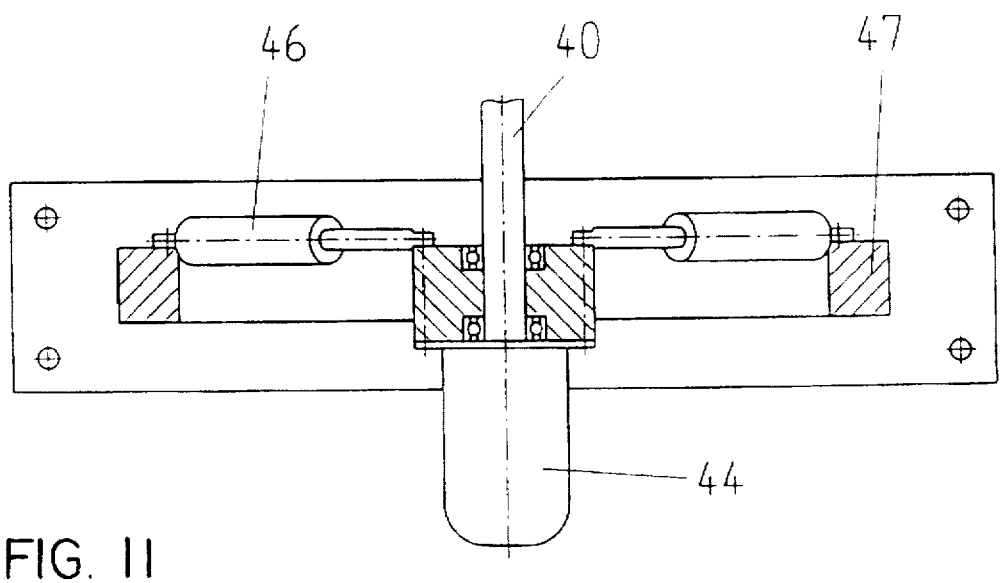
FIG. 11 is a plan view of the apparatus of FIG. 10.
Figure 12D:
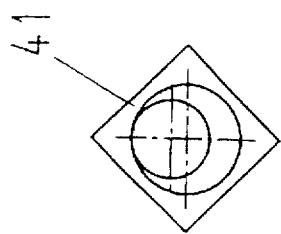
FIG. 12(a)–g is a view showing a plurality of alternative disc configurations.
Figure 12C:
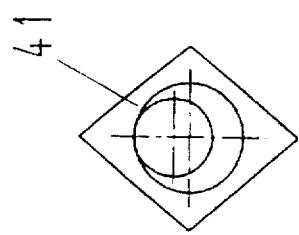
Figure 12B:
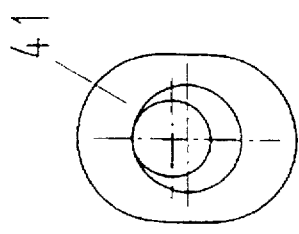
Figure 12A:
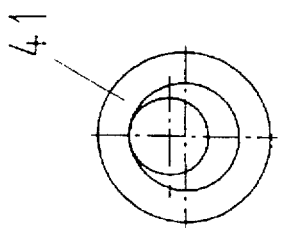
Figure 12G:
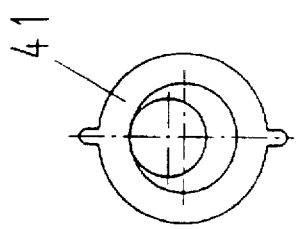
Figure 12F:
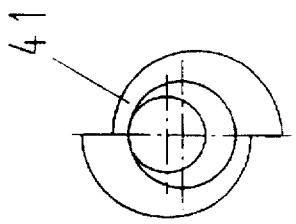
Figure 12E:
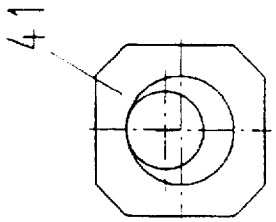

Because of the large mass of the knocking discs (41) and the high number of rotations of the knocking shaft (40) asymmetrical, forces may be generated irregularly. Accordingly, the bearings (43) may be supported by shock absorbers (46) in a bearing frame (47), as shown in FIGS. 10 and 11.

FIG. 12(a)–g shows possible shapes of knocking discs (41) which reach from round, over oval, rhombic, squared, multicornered to special shapes with knocking faces to knocking shoulders.

Figure 13:
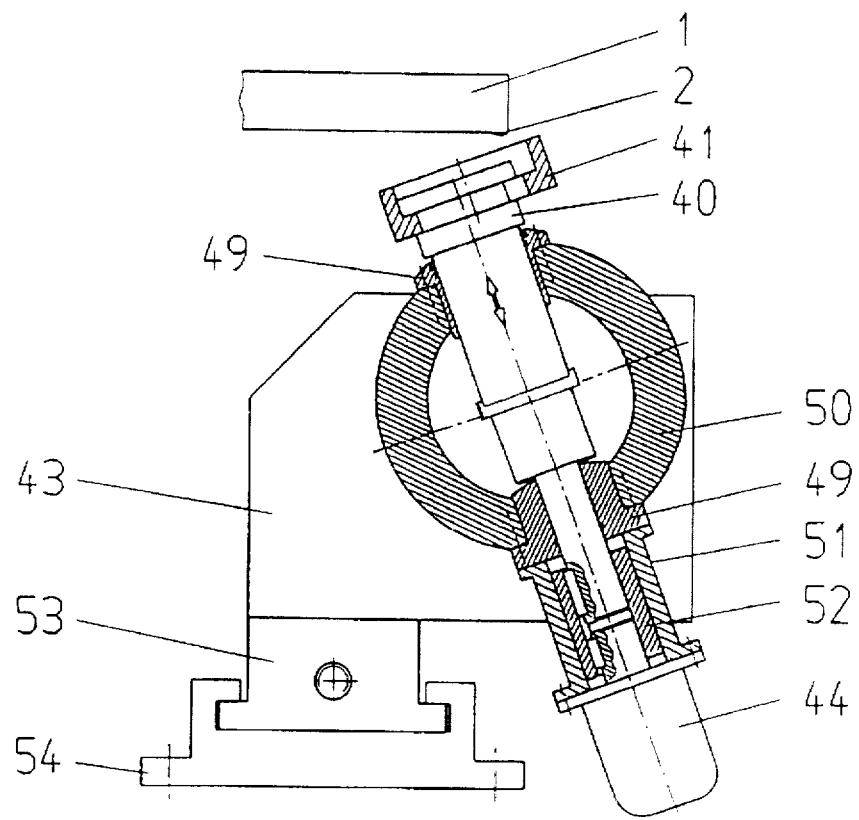
FIG. 13 is a side elevational view taken partly in section of an alternate form of the invention.
Figure 14:
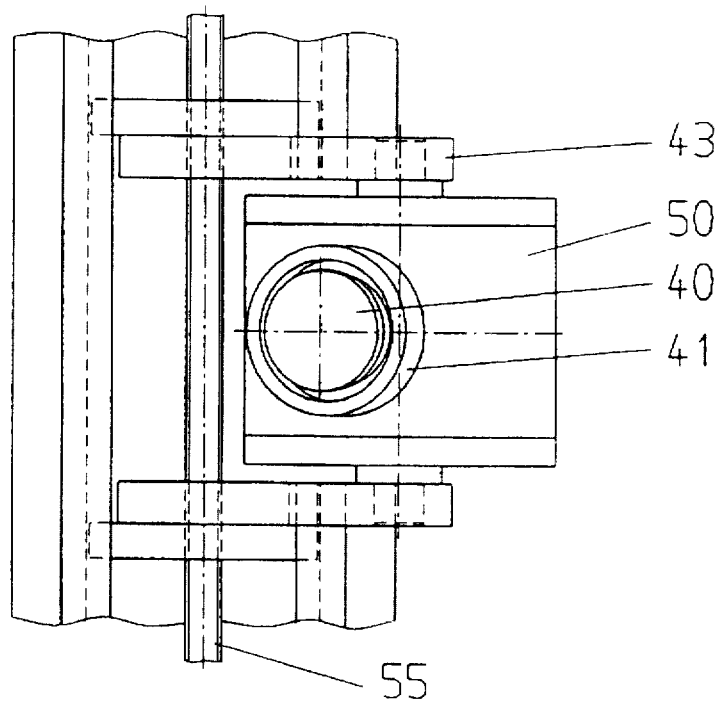
FIG. 14 is an end elevational view of the apparatus shown in FIG. 13.
Figure 15:
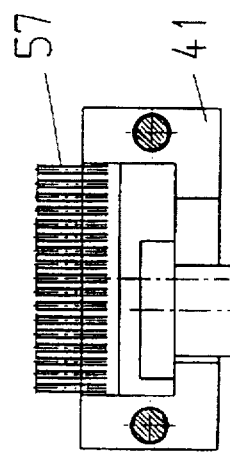
FIG. 15 is a sectional view of a knocking disc having brushes for burr removal.
Figure 16:
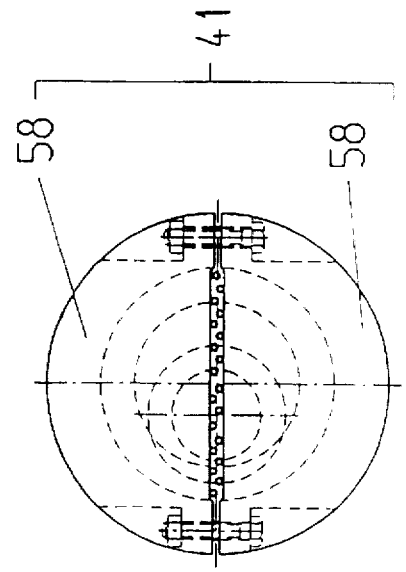
FIG. 16 is an end elevational view of the disc shown in FIG. 15.
Figure 17:
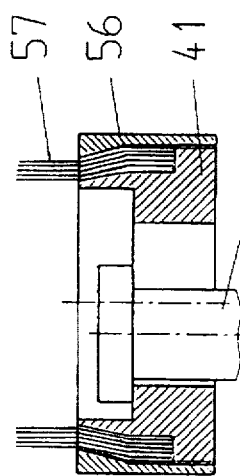
FIG. 17 is a sectional view showing an alternative form of brush.
Figure 18:
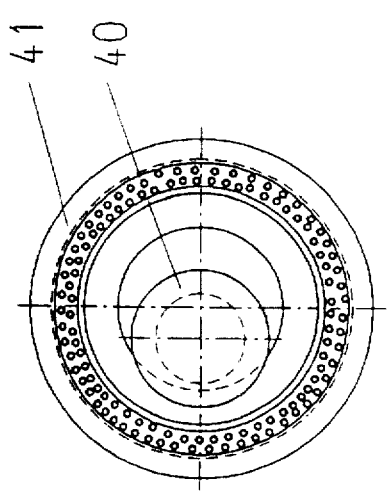
FIG. 18 is an end elevational view of the apparatus of FIG. 17.
Figure 19:
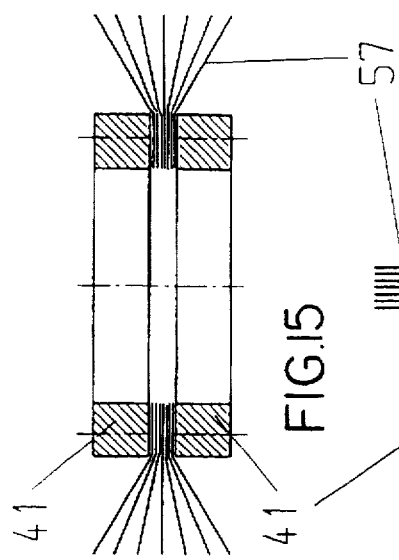
FIG. 19 is a sectional view showing another alternative form of brush.
Figure 20:
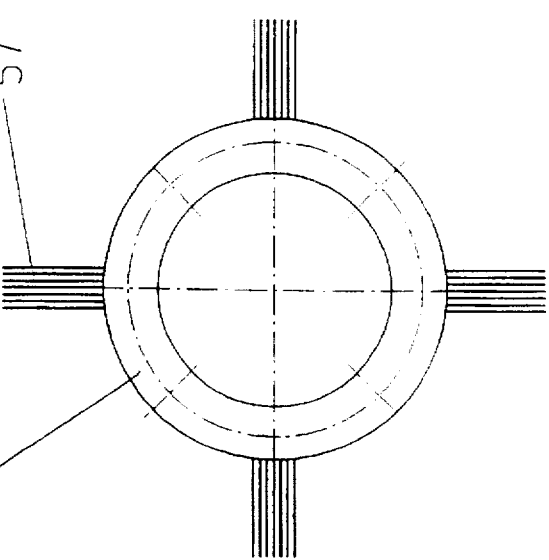
FIG. 20 is an end elevational view of the apparatus of FIG. 19.

FIGS. 13 and 14 show a knocking shaft (40) with one knocking disc (41) which can perform deburring vertically or nearly vertically under the work piece (1), i.e., hurling eccentrically. For this the knocking shaft (40) is reduced in one step and held in a compressed air filled knocking shaft body (50) with two sealing-equipped sleeves (49). On the lower end a bushing (52) with a shifting clutch (51) is provided for a shifting transfer of rotating forces produced by a drive (44). For this the compressed air presses the step of the knocking shaft (40) up and the drive (44) makes the knocking disc (41) on the upper end rotate eccentrically. The knocking shaft body (50), mounted in bearings (43), is brought against a stop not shown into a suitable angle against the lower surface of the work piece (1). For deburring the hurling knocking disc (41) is shifted parallel with the burr by means of the slide (53) carrying the bearings (43) and by the side drive (55) formed by a spindle in a slide guide (54).

Instead of applying any kind of knocking disc (41) with above mentioned horizontal axis it is as well possible, as shown in FIGS. 15, 16, 17, 18, 19 and 20 to form the knocking disc (41) like a brush with clamping ring (56) and spring wires (57) or with clamping brackets (58) and spring wires (57). This design is desirable at higher speeds because of lower masses, but has possible advantages with little burrs and far lower wear costs.

We claim:

1. Apparatus for removing burrs from flame cut steel slabs comprising a substantially cylindrical shaft rotatable about its axis at high speed, shaft drive means, and a plurality of burr knocking members loosely supported and rotatable through 360 degrees on the shaft, said burr knocking members having center bores of greater diameter than the outside diameter of the shaft.

2. Apparatus as claimed in claim 1 in which the burr knocking members are discs whose outer circumference is non-circular.

3. Apparatus as claimed in claim 1 in which the burr knocking members are wire brushes.

4. Apparatus as claimed in claim 1 in which the shaft is mounted on height adjusting means.

5. Apparatus as claimed in claim 1 in which the shaft is supported by shock absorbers.

6. Apparatus as claimed in claim 1 in which the knocking discs are mounted for enhanced frictional engagement with the shaft.

7. Apparatus as claimed in claim 1 in which the shaft is mounted on a housing and extendable therefrom by applying pneumatic pressure to the interior of the housing.

* * * * *